United States Patent [19]
Seifert, Jr.

[11] 3,804,036
[45] Apr. 16, 1974

[54] AIR INDUCTION APPARATUS FOR SEED DRILL TUBE

[76] Inventor: Edwin A. Seifert, Jr., Rt. 1, Box 22, Belgrade, Mont. 59714

[22] Filed: Oct. 5, 1972

[21] Appl. No.: 295,188

[52] U.S. Cl............................ 111/1, 111/7, 222/193
[51] Int. Cl............................................. A01c 7/20
[58] Field of Search.................. 111/1, 7, 6, 34, 86; 222/193; 202/52

[56] References Cited
UNITED STATES PATENTS

| | | | |
|---|---|---|---|
| 3,653,550 | 4/1972 | Williams | 222/193 X |
| 3,596,805 | 8/1971 | Farmery | 222/193 |
| 3,707,829 | 1/1973 | Siegel | 222/193 X |
| 3,322,080 | 5/1967 | Gatzke | 111/7 X |

Primary Examiner—Stephen C. Pellegrino
Attorney, Agent, or Firm—Clarence A. O'Brien; Harvey B. Jacobson

[57] ABSTRACT

A venturi zone producing structure for the delivery tube of a seed drill or material metering apparatus and for drawing air through the delivery tube on the upstream side of the venturi zone to assist in propelling the seed or other granular material from the associated fertilizer seed box to the venturi zone and for blowing the seed or granular material from the venturi zone to the discharge end of the delivery tube.

6 Claims, 3 Drawing Figures

PATENTED APR 16 1974　　　　　　　　　　　　　　3,804,036

AIR INDUCTION APPARATUS FOR SEED DRILL TUBE

The air induction apparatus of the instant invention has been primarily designed to provide a means of ensuring constant movement of seed or other granular material from a seed or fertilizer box to an associated furrow opener. While some seed drills include seed boxes which are elevated considerably above the frame of the seed drill and thus the various furrow openers of the seed drill may be supplied seed from the metering device of the seed box through a delivery tube which is inclined at least 45° relative to the horizontal throughout its entire length and such inclined delivery tubes substantially eliminate any slow down or blockage of the flow of seed from the seed box to the furrow opener, the excessive elevation at which a seed box of a seed drill of this type must be placed renders the task of replenishing the supply of seed within the hopper or seed box quite difficult due to the elevation to which the seed must be raised before being dumped into the seed box.

However, the air induction system of the instant invention enables delivery tube sections downstream from the air induction apparatus to be utilized even when these delivery tube downstream end portions are substantially horizontally disposed. Therefore, the air induction system of the instant invention enables the seed or fertilizer box of a seed or fertilizer drill to be disposed at a considerably lower elevation for ease in replenishing the supply of seed or fertilizer in the hopper of the drill.

The main object of this invention is to provide an air induction apparatus for a seed or fertilizer drill capable of functioning to ensure a proper and continuous flow of seed and/or fertilizer granules through the delivery tube of a drill, even when the delivery tube includes horizontal, or at least substantially horizontal, sections thereof.

Another object of this invention, in accordance with the immediately preceding object, is to provide a seed drill which will be wholly operative in the desired manner and yet enable the support of the seed or fertilizer hopper thereon at a reduced elevation and thereby facilitate the loading of the seed or fertilizer hopper.

Another important object of this invention is to provide an air induction apparatus for a seed or fertilizer drill and constructed in a manner whereby the air induction apparatus, independent of the air blower or air compressor thereof, includes no moving parts and therefore which will require little maintenance.

A final object of this invention to be specifically enumerated herein is to provide an air induction apparatus for a seed or fertilizer drill delivery tube and which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Referring now more specifically to the drawings, the numeral 10 generally designates a seed or fertilizer drill section constructed in accordance with the present invention. The section 10 may be operatively connected between a pair of similar sections 12 and 14 in order to establish a gang-type unit or assembly capable of covering a greater width path during each pass of the prime mover (not shown) behind which the structures 10, 12 and 14 are pulled.

Figure 1:
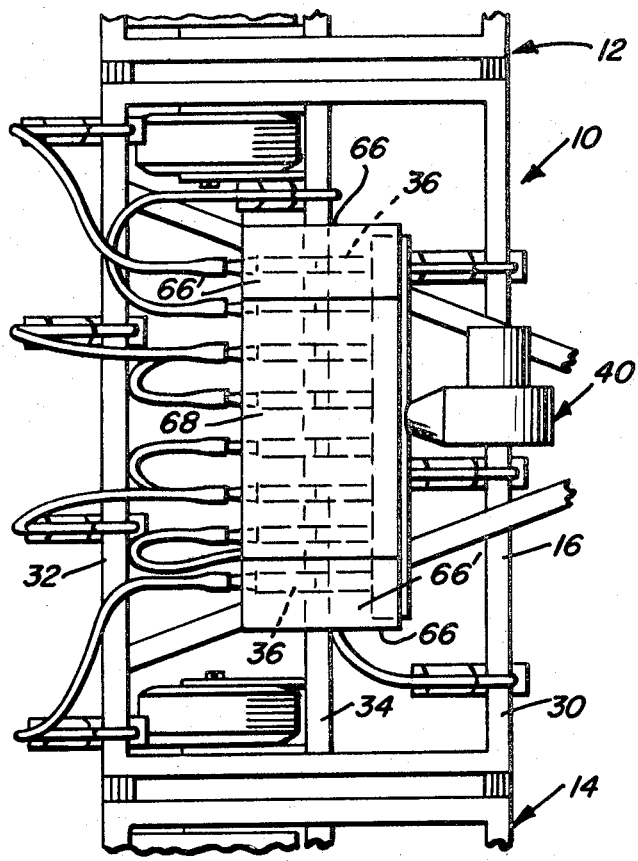
FIG. 1 is a top plan view of a seed or fertilizer drill with the air induction system of the instant invention operatively associated therewith.
Figure 2:
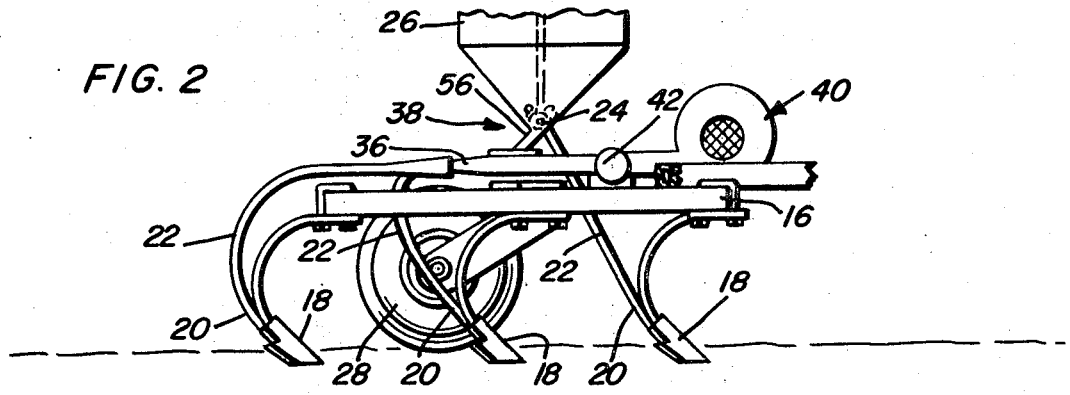
FIG. 2 is a fragmentary side elevational view of the assemblage illustrated in FIG. 1.
Figure 3:
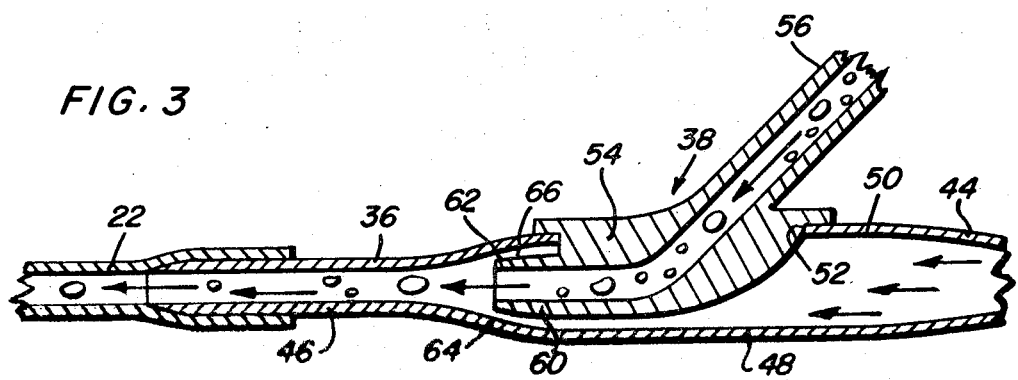
FIG. 3 is an enlarged fragmentary vertical sectional view taken substantially upon a plane passing through the centerline of that portion of one of the delivery tubes of the drill with which the air induction apparatus of the instant invention is operatively associated.

From FIGS. 1 and 2 of the drawings it may be seen that the section 10 is generally conventional in structure in that it includes a rectangular horizontal main frame 16 from which a plurality of spring arm mounted front-to-rear staggered and transversely spaced furrow openers 18 are supported. Each furrow opener 18 has the discharge end portion 20 of a delivery tube 22 operatively associated therewith and the inlet end portions of the delivery tubes 22 are operatively communicated with the metering device 24 of a seed or fertilizer hopper 26. In addition, the main frame 16 includes conventional vertically adjustable ground engaging support wheels 28.

The main frame 16 includes front and rear transverse members 30 and 32 and a center transverse member 34. The delivery tubes 22 extending to the furrow openers 18 supported from the front transverse member 30 of the main frame 16 extend directly to the metering device 24 and the inclination of the delivery tubes 22 of the forward furrow openers 18 is such that uninterrupted dropping of seed or fertilizer from the hopper 26 to the forward furrow openers 18, by gravity, is ensured. However, the inlet end portions of the delivery tubes 22 extending to the furrow openers 18 supported from the rear and intermediate transverse frame members 32 and 34 are telescoped over the discharge nozzle portions 36 of the air induction apparatus of the instant invention which is referred to in general by the reference numeral 38. The apparatus 38 includes a motor driven blower assembly referred to in general by the reference numeral 40 supported from the front transverse member 30 and discharging large quantities of air under pressure into an elongated transversely extending pressure manifold 42. The pressure manifold 42 is provided with eight discharge nozzle portions 36 spaced longitudinally therealong and each discharge nozzle portion extends rearwardly from the pressure manifold 42 and includes a reduced diameter inlet end portion 44, a reduced diameter outlet end portion 46 and a somewhat larger diameter intermediate portion 48.

The upper wall portion 50 of each intermediate portion 48 is provided with an opening 52 which is elongated longitudinally of the intermediate portion 48 and the nozzle outlet end 54 of a drop tube 56 is secured in each opening 52. The inlet ends of the drop tubes 56 receive grain or fertilizer from the metering device 24.

In operation, the blower or compressor 40 delivers large quantities of air under pressure to the pressure manifold 42 and thus to the inlet end portions 44 of the discharge nozzle portions 36 of the air induction apparatus 38. Thus, air from the blower or compressor 40 is pumped through the discharge nozzle portions 36 and the delivery tubes 22 connected thereto. The nozzle outlet ends 54 include generally cylindrical terminal end nozzles 60 which extend longitudinally of the intermediate portion 48 and open in a downstream direction. The outlet ends of the cylindrical terminal end nozzles 60 are exteriorly tapered as at 62 and are disposed in those portions of the discharge nozzle portions 36 wherein the intermediate portion 48 tapers as at 64 into the outlet end portions 46 to thus define an annular venturi zone 66 surrounding the outlet end of the cylindrical terminal end nozzle 60 in each discharge nozzle portion 36. As the seed and/or fertilizer falls by gravity downwardly through the tubes 56, air is also drawn through the tubes 56 from the hopper 26 and metering device 24 to assist in propelling the seed and fertilizer downwardly through the tubes 56 in a continuous and orderly manner, this flow of air being caused by the annular venturi zone 66 creating a reduced pressure zone at the end of each terminal end nozzle 60. Then, as the seed and/or fertilizer exists from each terminal end nozzle 60, the seed and/or fertilizer is entrained in the stream of air flowing through the discharge nozzle portion 36 and into the associated drip tube 22. Therefore, uninterrupted flow of seed and/or fertilizer from the hopper 26 through the tube 56, the discharge neck portion 36 and the associated drop tube 22 to the corresponding furrow opener 18 is assured.

Inasmuch as the discharge nozzle portions 36 may be horizontally disposed and the adjacent ends of the corresponding drop tubes 22 may also be horizontally disposed, the need to position the hopper 26 at a higher elevation in order to ensure seed and/or fertilizer feed by gravity only to the intermediate and rear furrow openers 18 is eliminated. Thus, the hopper 26 may be mounted at a lower elevation to facilitate the loading of the hopper 26.

The seed or fertilizer hopper 26 includes opposite end walls 66 whose upper portions 66' are upwardly convergent. In this manner, when the section 10 is mounted between corresponding sections 12 and 14 with the latter supported from the section 10 for upward swinging movement of their remote ends toward retracted positions, the upwardly convergent upper end wall portions 66' of the seed or fertilizer hopper 26 supported from the section 10 as well as the hoppers supported from the sections 12 and 14 enable sufficient clearance between the hoppers whereby the sections 12 and 14 may have their remote ends swung upwardly until the sections 12 and 14 are substantially vertically disposed. In addition, each of the hoppers 26 includes a removable top wall 68 and the upwardly convergent upper side wall portions 66' of the hoppers supported from the sections 12 and 14 enable the side section hoppers to be inclined in substantially upright positions while partially full of seed or fertilizer and with the seed or fertilizer contained therein in the lower ends of the hoppers below the corresponding lower ends of the top walls 68 thereof.

Although the annular venturi zone 66 creates a reduced pressure zone at the end of each terminal end nozzle 60 and thus draws air down through the tubes 56 from the hopper 26 and the metering device 24, it is not necessary that the upper ends of the tubes 56 be imperforate. In fact, a transparent tube section provided with air inlet openings may be interposed in the upper more vertically disposed ends of the tubes 56, if desired. In this manner, air need not be drawn downwardly into the tubes 56 from the hopper 26 and metering device 24.

Still further, the system of the instant invention may be adapted to various drills and fertilizer spreaders, or applied as a feeding system for animals. In any event, the apparatus of the instant invention enables the utilization of shorter seed or fertilizer hoppers of low silhouette design, thereby enabling easier filling of the hoppers, and the sections 12 and 14 to be folded relative to the section 10. Also, the air induction apparatus utilizes only a single blower and relatively light manifolding to thereby maintain the overall weight thereof at a minimum.

Also, the taper 62 of each nozzle 60 is slightly less (approximately 5°) than the taper 64 of the outer extremity of the corresponding venturi zone 66. This insures maximum control over the seed and/or fertilizer being discharged from the nozzle 60.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a material hopper of the type including a metered gravity outlet to which the upper inlet end of an upstanding discharge tube is operatively connected for receiving material gravity dispensed from said outlet, a source of air under pressure, conduit means including an inlet end communicated with said source and an outlet end, one side wall portion of an intermediate portion of said conduit means having an opening formed therein, the lower outlet end of said discharge tube extending through said opening in at least reasonably fluid-tight sealed engagement with said conduit means and including a terminal end generally centered in said conduit means and opening toward the outlet end thereof, said intermediate portion of said conduit means being internally transversely enlarged relative to the internal transverse dimensions of the outlet end portion of said conduit means, the downstream end of the inside of said intermediate portion of said conduit means smoothly tapering toward said outlet end portion of said conduit means, the terminal end of said outlet end of said discharge tube being in the form of an outlet nozzle generally centered and opening in a downstream direction within the tapering downstream end of said intermediate portion of said conduit means, whereby an unobstructed annular zone of the interior of said conduit means extends 360° about said terminal end.

2. The combination of claim 1 wherein said intermediate portion of said conduit means is generally horizontally disposed and said wall portion comprises an upper wall portion of said conduit means.

3. In combination, a seed drill including an upper frame portion, a seed hopper supported from said frame portion and including a metered gravity outlet to which the upper end of an upstanding discharge tube is secured, a source of air under pressure, conduit means including an inlet end communicated with said source and an outlet end, one side wall portion of an intermediate portion of said conduit means having an opening formed therein, the lower outlet end of said discharge tube extending through said opening in at least reasonably fluid-tight sealed engagement with said conduit means and including a terminal end generally centered in said conduit means and opening toward the outlet end thereof, said intermediate portion of said conduit means being internally transversely enlarged relative to the internal transverse dimensions of the outlet end portion of said conduit means, the downstream end of the inside of said intermediate portion of said conduit means smoothly tapering toward said outlet end portion of said conduit means, the terminal end of said outlet end of said discharge tube being in the form of an outlet nozzle generally centered and opening in a downstream direction within the tapering downstream end of said intermediate portion of said conduit means, whereby an unobstructed annular zone of the interior of said conduit means extends 360° about said terminal end, said outlet end of said conduit opening in a downward direction for depositing seed on the ground over which said frame portion is being moved.

4. The combination of claim 3 wherein said draft implement includes a plurality of depending ground-engageable furrow opening means, said material hopper including a plurality of metered gravity outlets, a plurality of upstanding discharge tubes operatively connected to said outlets, a plurality of said conduit means communicated with said source of air under pressure, the outlet ends of said discharge tubes each opening into the intermediate portion of a corresponding conduit means.

5. The combination of claim 3 wherein said intermediate portion of said conduit means is generally horizontally disposed and said wall portion comprises an upper wall portion of said conduit means.

6. In combination with a material hopper of the type including a metered gravity outlet to which the upper inlet end of an upstanding discharge tube is operatively connected for receiving material gravity dispensed from said outlet, a source of air under pressure, conduit means including an inlet end communicated with said source and an outlet end, one side wall portion of an intermediate portion of said conduit means having an opening formed therein, the lower outlet end of said discharge tube extending through said opening in at least reasonably fluid-tight sealed engagement with said conduit means and including a terminal end generally centered in said conduit means and opening toward the outlet end thereof, a draft implement of the type having an upper frame portion and depending ground-engageable furrow opening means, said hopper being supported from said upper frame portion, and the outlet end of said conduit means opening outwardly in a downward direction closely behind said furrow opening means, said intermediate portion of said conduit means being generally horizontally disposed and said wall portion comprising an upper wall portion of said conduit means, said intermediate portion of said conduit means being internally transversely enlarged relative to the internal transverse dimensions of the outlet end portion of said conduit means, the downstream end of the inside of said intermediate portion of said conduit means smoothly tapering toward said outlet end portion of said conduit means, the terminal end of said outlet end of said discharge tube being in the form of an outlet nozzle generally centered and opening in a downstream direction within the tapering downstream end of said intermediate portion of said conduit means, whereby an unobstructed annular zone of the interior of said conduit means extends 360° about said terminal end.

* * * * *